US008586955B2

(12) United States Patent
Tay

(10) Patent No.: US 8,586,955 B2
(45) Date of Patent: Nov. 19, 2013

(54) APPARATUS AND METHOD FOR ATTENUATING HIGH ENERGY RADIATION BASED ON DETECTED VEHICLE TYPE

(76) Inventor: Ko Khee Tay, Singapore (SG)

(\*) Notice: Subject to any disclaimer, the term of this patent is extended or adjusted under 35 U.S.C. 154(b) by 92 days.

(21) Appl. No.: 12/888,046

(22) Filed: Sep. 22, 2010

(65) Prior Publication Data

US 2012/0068092 A1     Mar. 22, 2012

(51) Int. Cl.
*G21F 5/00* (2006.01)
*G21F 5/02* (2006.01)
*G21F 5/04* (2006.01)

(52) U.S. Cl.
USPC .......................................... 250/515.1; 378/20

(58) Field of Classification Search
USPC .......................................... 250/515.1; 378/20
See application file for complete search history.

(56) References Cited

U.S. PATENT DOCUMENTS

| 5,734,337 | A  | * | 3/1998  | Kupersmit ..................... 340/937 |
| 5,910,973 | A  | * | 6/1999  | Grodzins ........................ 378/57 |
| 5,940,468 | A  |   | 8/1999  | Huang et al. |
| 6,252,929 | B1 | * | 6/2001  | Swift et al. ...................... 378/57 |
| 6,459,764 | B1 | * | 10/2002 | Chalmers et al. ............... 378/88 |
| 7,308,076 | B2 |   | 12/2007 | Studer et al. |
| 7,408,160 | B2 | * | 8/2008  | Verbinski et al. .......... 250/358.1 |
| 7,734,102 | B2 | * | 6/2010  | Bergeron et al. ............. 382/209 |
| 2003/0128275 | A1 | * | 7/2003 | Maguire ........................ 348/149 |
| 2004/0071319 | A1 | * | 4/2004 | Kikuchi ........................ 382/107 |
| 2005/0169421 | A1 | * | 8/2005 | Muenchau et al. ............. 378/57 |
| 2005/0190958 | A1 | * | 9/2005 | Woods et al. ................. 382/141 |
| 2006/0269104 | A1 | * | 11/2006 | Ciolli ............................ 382/104 |
| 2008/0013791 | A1 | * | 1/2008 | Kikuchi ........................ 382/107 |
| 2008/0025470 | A1 | * | 1/2008 | Streyl ............................ 378/203 |
| 2008/0025825 | A1 | * | 1/2008 | Fujiwara ....................... 414/279 |
| 2009/0086907 | A1 | * | 4/2009 | Smith ............................. 378/57 |
| 2010/0084586 | A1 | * | 4/2010 | Teodorescu ................ 250/516.1 |

FOREIGN PATENT DOCUMENTS

| WO | 03105159 A1 | 12/2003 |
| WO | 2005043144 A1 | 12/2005 |
| WO | 2009106815 A2 | 3/2009 |

OTHER PUBLICATIONS http://www.as-e.com/products_solutions/cargo_vehicle_inspection.asp, Copyright, 2011.
http://www.uniblitz.com/x-ray-shutters.aspx, Copyright, 2011.

\* cited by examiner

*Primary Examiner* — Phillip A Johnston
*Assistant Examiner* — Brooke Purinton
(74) *Attorney, Agent, or Firm* — Ryan A. Schneider, Esq.; Troutman Sanders LLP

(57) ABSTRACT

An apparatus for attenuating high energy radiation including an attenuation member for attenuating high energy radiation in a high energy radiation field emitted from a high energy radiation source towards a subject. A control unit is provided for selectively activating the attenuation member. A method for attenuating high energy radiation is also disclosed.

22 Claims, 9 Drawing Sheets

APPARATUS AND METHOD FOR ATTENUATING HIGH ENERGY RADIATION BASED ON DETECTED VEHICLE TYPE

BACKGROUND OF THE INVENTION

1. Field of the Invention

The present invention relates to an apparatus and method for attenuating high energy radiation.

2. Description of the Related Art

At cross border immigration checkpoints, x-ray monitoring systems are sometimes used for conducting security inspection of vehicles, including motorcycles. During the inspection process, drivers and passengers of the vehicles or motorcycles are exposed to the high energy radiation of the x-ray source.

While the high energy radiation emitted by the x-ray source for such x-ray monitoring systems is usually rated safe for humans, psychologically, people are uncomfortable with being x-rayed. Furthermore, for those who commute across borders frequently, their health risks due to high energy irradiation are inevitably increased. Privacy is also an issue as the X-ray images captured would show up naked images of people.

At times, a higher dosage of x-ray is required for monitoring vehicles having bodies with high energy radiation filtering properties, for example, cargo-containing parts of the vehicle. To eliminate the risk of exposing humans to the higher dosage of high energy radiation, some of the x-ray monitoring systems are designed to perform screening without the presence of the drivers/passengers. Drivers/passengers have to exit the vehicle. This is not a good solution as it would cause delays at the checkpoints.

Another solution, PCT publication WO 2009/106815, provides more than one x-ray sources with different energy outputs. High energy scanning from a High energy x-ray source is turned on for scanning a cargo-containing part of the vehicle and Low energy scanning from a Low energy x-ray source is used for scanning that part of vehicle occupied by a human or animal. The x-ray sources are turned on and off appropriately. Alternatively, the human or animal occupied part of the vehicle is not scanned at all. It is appreciated that x-ray sources take time to be energized after they have been switched off. It is questionable whether the x-ray source could energize fast enough to avoid undue delay. Furthermore, it is also appreciated that having more than one x-ray sources is costly.

X-ray monitoring systems are also widely used in the medical field. It has been observed that only selected parts of x-ray images of patients taken using conventional x-ray machines, only selected parts are required for medical diagnosis. The other parts of the images are redundant thus indicating that the patient was subjected to high energy radiation unnecessarily.

BRIEF SUMMARY OF THE INVENTION

In accordance with one aspect of the present invention, there is provided an apparatus for attenuating high energy radiation, the apparatus comprising: an attenuation member for attenuating high energy radiation in a high energy radiation field emitted from a high energy radiation source towards a subject; and a control unit for selectively activating the attenuation member.

The apparatus may be configured to identify a zone of a vehicle to pass the high energy radiation field, the vehicle being the subject, the control unit being configured to activate the attenuation member thereby to attenuate high energy radiation in the high energy radiation field directed towards the zone of the vehicle.

The apparatus may be configured to identify the zone of the vehicle from an image of the vehicle, the image comprising data relating to a vehicle user and for the control unit to activate the attenuation member in dependence of information derived from a series of images of the vehicle.

The series of images may comprise a first image of the vehicle at a first point approaching the high energy radiation field and a second image of the vehicle at a second point approaching the high energy radiation field, and the control unit may be configured to calculate a speed of approach of the vehicle from the first image and the second image and to activate the attenuation member in dependence of the calculated speed of approach.

The control unit may be configured to activate the attenuation member in dependence of information derived from a reference image.

The apparatus may be configured to activate the attenuation member when a point in the zone crosses a predetermined point in the high energy radiation field.

The attenuation member may be arranged to be deployed into and retracted from the high energy radiation field.

The apparatus may comprise a partition having an aperture for the high energy radiation field to pass therethrough, and the apparatus may be arranged for the attenuation member to attenuate a portion of the high energy radiation field passing through the aperture.

The apparatus may comprise a housing for housing the attenuation member, the apparatus being arranged for the attenuation member to be selectively activated by being deployed from within the housing and to be deactivated by being retracted into the housing.

The apparatus may comprise an image receptor for acquiring data for producing a radiographic image of the subject.

The apparatus may comprise a guideway for directing the subject into the high energy radiation field in a preferred orientation.

The apparatus may comprise a plurality of attenuation members for selectively attenuating high energy radiation in a corresponding plurality of portions of the high energy radiation field.

The apparatus may be configured to identify a zone of a live subject, and for the attenuation member to be positioned selectively to attenuate high energy radiation in the high energy radiation field directed towards the zone of the live subject.

The apparatus may be configured for the attenuation member to be positioned selectively in dependence of information derived from an image of the live subject.

In accordance with another aspect of the present invention, there is provided a method for attenuating high energy radiation, the method comprising selectively activating an attenuation member under control of a control unit to attenuate high energy radiation in a high energy radiation field emitted from a high energy radiation source towards a subject.

The method may comprise identifying a zone of a vehicle passing through the high energy radiation field, the vehicle being the subject; and activating the attenuation member to attenuate high energy radiation in the high energy radiation field directed towards the zone of the vehicle.

The method may comprise identifying the zone of the vehicle from an image of the vehicle, the image comprising data relating to a vehicle user; and activating the attenuation member in dependence of information derived from a series of images of the vehicle.

The method may comprise calculating a speed of approach of the vehicle from a first image of the vehicle at a first point approaching the field of high energy radiation and a second image of the vehicle at a second point approaching the field of high energy radiation; and activating the attenuation member in dependence of the calculated speed of approach, The method may comprise activating the attenuation member in dependence of information derived from a reference image.

The method may comprise activating the attenuation member when a point in the zone crosses a predetermined point in the high energy radiation field.

The method may comprise selectively activating the attenuation member by deploying the attenuation member into the high energy radiation field and retracting the attenuation member from the high energy radiation field.

The method may comprise attenuating a portion of the high energy radiation field passing through an aperture of a partition.

The method may comprise selectively activating the attenuation member to be deployed from within a housing and to be deactivated by being retracted into the housing.

The method may comprise using an image receptor to acquire data for producing a radiographic image of the subject.

The method may comprise using a guideway to direct the subject into the high energy radiation field in a preferred orientation.

The method may comprise selectively attenuating high energy radiation in a plurality of portions of the high energy radiation field using a corresponding plurality of attenuation members.

The method may comprise identifying a zone of a live subject; and selectively positioning the attenuation member to attenuate high energy radiation in the high energy radiation field directed towards the zone of the live subject.

The method may comprise selectively positioning the attenuation member in dependence of information derived from an image of the live subject.

BRIEF DESCRIPTION OF THE DRAWINGS

The invention will be better understood and readily apparent from the following written description, by way of example only and in conjunction with the drawings, in which.

DETAILED DESCRIPTION OF PREFERRED EMBODIMENTS

Figure 1:
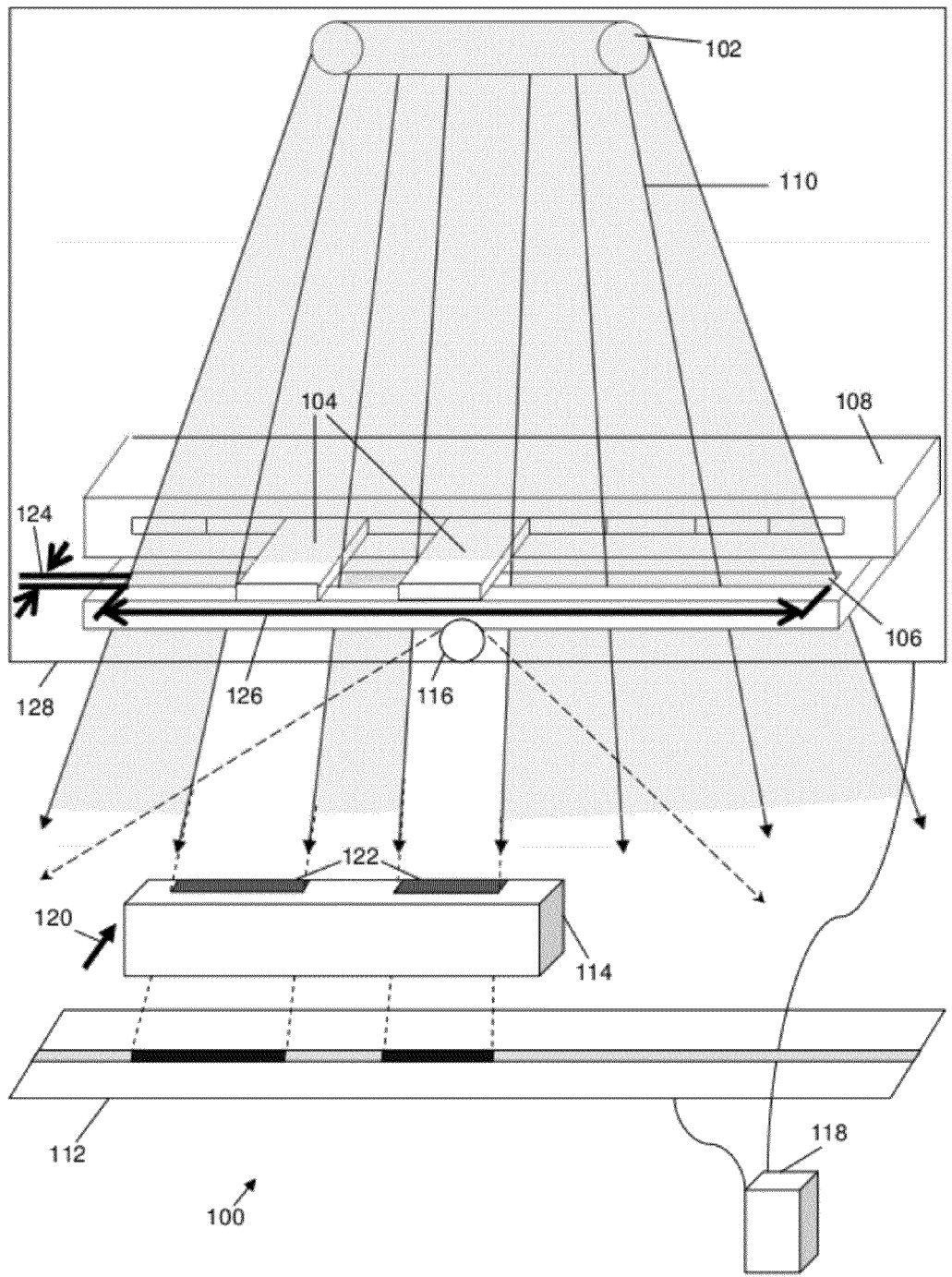
FIG. 1 shows a partially see-through perspective view of an apparatus for attenuating high energy radiation.

With reference to FIG. 1, there is an apparatus 100 for attenuating high energy radiation. When used in this description, "attenuating" includes partly as well as complete blocking or obstruction of high energy radiation. Similar meaning applies for "attenuate". "High energy radiation" herein refers to penetrating particle or electromagnetic high energy radiation with energies of more than a few thousand electron volts. It may include electrons, neutrons, protons, mesons, X-rays, and gamma rays.

Generally speaking, FIG. 1 principally illustrates an apparatus for attenuating high energy radiation, the apparatus comprising one or more attenuation members 104 for attenuating high energy radiation in a high energy radiation field 110 emitted from a high energy radiation source 102 towards a subject 114. The apparatus also comprises a control unit 118 for selectively activating the attenuation member 104.

More specifically, in the example of FIG. 1, apparatus 100 comprises a high energy radiation source 102 emitting a high energy radiation field, a partition 128 having an aperture 106 for the high energy radiation field to pass therethrough, a detector 116 for detecting a part 122 (or a zone) of a subject 114 and an image receptor 112 for receiving high energy radiation transmitted through the aperture 106. In FIG. 1, the partition 128 is shown in schematic as being transparent to illustrate parts of the high energy radiation source 102, the aperture 106 and the attenuation mechanism 108 contained above the partition 128. Partition 128 may be part of a housing for housing the high energy radiation source 102, attenuation mechanism 108 and attenuation member(s) 104. The high energy radiation source 102 is located above the aperture 106 in the partition 128. A subject 114 positioned below the aperture 106 will, normally, be exposed to high energy radiation transmitted through the aperture 106 from the high energy radiation source 102. That is, the subject 114 is located outside of the partition 128 and beneath the aperture 106.

One subject may be a vehicle, such as a passenger car. The apparatus 100 operates to identify a zone of the vehicle to pass the high energy radiation field. The control unit activates the attenuation member to attenuate high energy radiation in the high energy radiation field directed towards the zone of the vehicle. Thus, attenuation mechanism 108 is configured to attenuate selectively high energy radiation transmitted through the aperture 106 that is directed towards subject 114. Thus, a part 122 of the subject 114 is not exposed to the high energy radiation, or at least is exposed to a diminished dosage of radiation due to the attenuation of the radiation with attenuation member(s) 104. A control unit 118 is used for generating a radiographic image of the subject 114. The image is generated based on high energy radiation levels of high energy radiation penetrated through the subject 114 and received by the image receptor 112.

In FIG. 1, the high energy radiation source 102 is an x-ray source. Depending on the type of the subject 114, the setting of the intensity or other parameters of the x-ray source could be varied accordingly. It is appreciated that the high energy radiation source 102 could also be a gamma-ray source, and the like.

The shape of the aperture 106 in the example of FIG. 1 is elongate, substantially rectangular and has length 126 and width 124 in the range of about 0.01 mm to 10 mm, or thereabouts, therefore meaning that, relatively speaking at least, the aperture is narrow in comparison to its length. The dimension of length 126 depends on the size of the subject 114 to be subjected to high energy radiation. An example of the length 126 would be provided below with reference to FIG. 3B.

In FIG. 1, an x-ray beam 110 transmitted through the aperture 106 fans out across the length of the aperture 106 thereby forming a high energy radiation field. Due to the high energy properties of the x-ray beam, the width of the x-ray beam 110 transmitted through the narrow aperture 106 to the image receptor 112 is substantially the same as the width 124 of the aperture 106, subject to any "fanning" of the radiation field. The image receptor 112 captures x-ray images of the subject 114 as its body crosses the x-ray beam 110 based on received high energy radiation levels of high energy radiation penetrated through the body of the subject 114. Each x-ray image captured by the image receptor 112 at any time instant when the subject 114 is crossing the x-ray beam is a "slice" of the top down view of the subject 114. A composite x-ray image of the top down view of the subject 114 is formed by joining all "slices" of x-ray images of the top down view of the subject 114 captured when the subject 114 is passing through the x-ray beam. The composite x-ray image of the top down view of the subject 114 could be converted to image data for displaying on a monitor.

In the example of FIG. 1, attenuation mechanism 108 is a housing that houses one or more attenuation members 104 (104 is used interchangeably in this description to indicate just one or more than one attenuation member) disposed along the length 126 of the aperture 106. If more than one attenuation member is utilized, these may be disposed adjacent one another or with a gap therebetween. One or more of the attenuation members 104 is extendable from the attenuation mechanism 108. In FIG. 1, two alternately spaced attenuation members 104 are extended, the gap between them in the figure represents the width of another attenuating member 104 in retracted mode and stored within the attenuation mechanism 108. When extended, the attenuation members 104 extend into the path of the high energy radiation transmitted through the aperture 106. High energy radiation directed towards the part 122 of the subject 114 is attenuated and that part of the subject 114 is therefore not exposed to high energy radiation. The attenuation members 104 are retracted into the attenuation mechanism 108 when not in use to attenuate high energy radiation transmitted through the aperture 106. When all the attenuation members 104 are extended, the aperture 106 is fully covered by the attenuating members 104, thereby blocking, at least partly, high energy radiation.

Each attenuation member 104 is driven by an Alternating Current/Direct Current motor, magnetic repelling device, spring retractable device and the like, which are located in the attenuation mechanism 108 and provide the necessary moving force to extend and retract the attenuation member 104.

The detector 116 in FIG. 1 is a camera. It captures images of the subject 114 crossing the x-ray beam 110. The detector 116 is electronically connected to the control unit 118 that runs appropriate software for detecting moving or stationary subjects captured by the detector 116 and for selecting the part(s) 122 (122 denotes more than one part) of the subjects not to be exposed to the x-ray beam 110 transmitted through the aperture 106. The control unit 118 is configured to communicate electronically with the attenuation mechanism 108 to trigger movement of the attenuation members 104 at appropriate times to attenuate high energy radiation directed towards selected part(s) 122 of the subject 114.

If the subject is a vehicle, the apparatus 100 may be configured to identify the zone of the vehicle from an image of the vehicle captured by the detector 116. The image comprising data relating to a vehicle user (e.g. a driver) and for the control unit to activate the attenuation member in dependence of information derived from a series of images of the vehicle. In one implementation, the series of images comprises a first image of the vehicle at a first point approaching the field of high energy radiation and a second image of the vehicle at a second point approaching the field of high energy radiation. The control unit calculates a speed of approach of the vehicle from the first image and the second image and activates the attenuation member in dependence of the calculated speed of approach. Additionally, the control unit may be arranged to activate the attenuation member in dependence of information derived from a reference image. One technique makes pixel comparisons, as described below.

During operation, the subject 114 approaches the x-ray beam 110 in a direction indicated by arrow 120. The detector 116 detects the subject 114 approaching as it moves into the field of capture of the detector 116. The direction indicated by arrow 120 is substantially perpendicular to the length 126 of the x-ray beam 110 as shaded in FIG. 1. In the apparatus 100 of FIG. 1, the part(s) 122 of the subject 114, which are not to be exposed to the high energy radiation of the x-ray beam 110, are determined by the software based on results of image analysis of one or more images of the subject 114 caught by the detector 116. The software detects the part(s) of the subject 114 that is not to be exposed to high energy radiation based on predefined criteria for the type of the subject 114. For instance, if the subject 114 is a car, and area occupied by a vehicle user, such as the driver or a passenger is not to be exposed to high energy radiation, the predefined criteria will comprise of data enabling the software to detect from the image analysis the area occupied by the passenger car. The image analysis of the subject 114, which may involve pixel comparison, could help to determine, for instance, subject size, subject orientation, subject positioning in the images captured by the detector 116 and the part(s) of the object 114 that is not to be exposed to radiation. The predefined criteria may be defined by an operator prior to operation of the apparatus 100.

It is appreciated that the detector 116 could comprise one or more cameras and/or one or more sensors.

FIG. 1 depicts a scenario where the subject 114 is crossing halfway through the x-ray beam 110. The part(s) 122 on the subject 114 not exposed to the high energy radiation are illustrated by dark shadings in FIG. 1. As long as the attenuation members 104 continue to attenuate, at least partly, the high energy radiation transmitted through the aperture 106, the part(s) 122 on the subject is, at least partly, not exposed to high energy radiation. As a result, high energy radiation, directed towards the part(s) 122 is, at least partly, not received by the image receptor 112 and the composite x-ray image of the top down view of the subject 114 shows black out portions at the location of the part(s) 122 of the subject.

Figure 7:
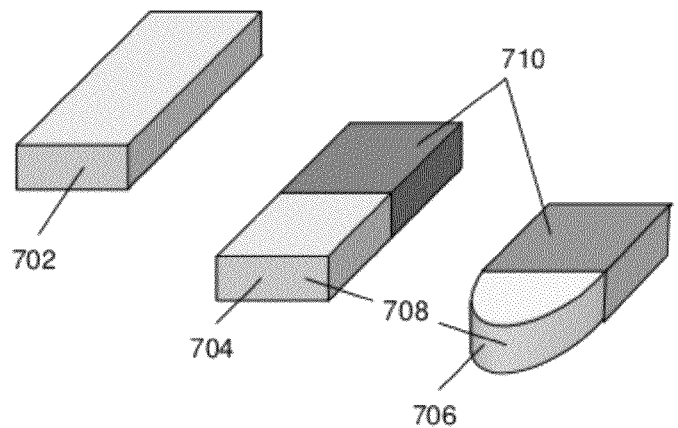
FIG. 7 shows perspective views of examples of attenuation members herein described.

The attenuation members 104 could be made of materials including, for instance, lead, which can attenuate high energy radiation emitted by the radiation source 102. FIG. 7 shows examples of the design of individual attenuation members 104. For instance, attenuation member 702 is a rectangular cuboid made of lead. Attenuation members 704 and 706 has a first portion 708 made of lead and a second portion 710 made of another material, for instance, plastic. Attenuation member 704 is different from attenuation member 706 in that the first portion 708 of the attenuation member 706 is rounded. As the first portion 708 is made of lead, it is meant for attenuating high energy radiation. The second portion 710 is made for attaching to the attenuation mechanism 108 to support the first portion 708. With reference to FIGS. 1 and 7, if attenuation members 704 or 706 are used, the second portion 710 is arranged to be fixed to the attenuation mechanism 108.

Figure 2:
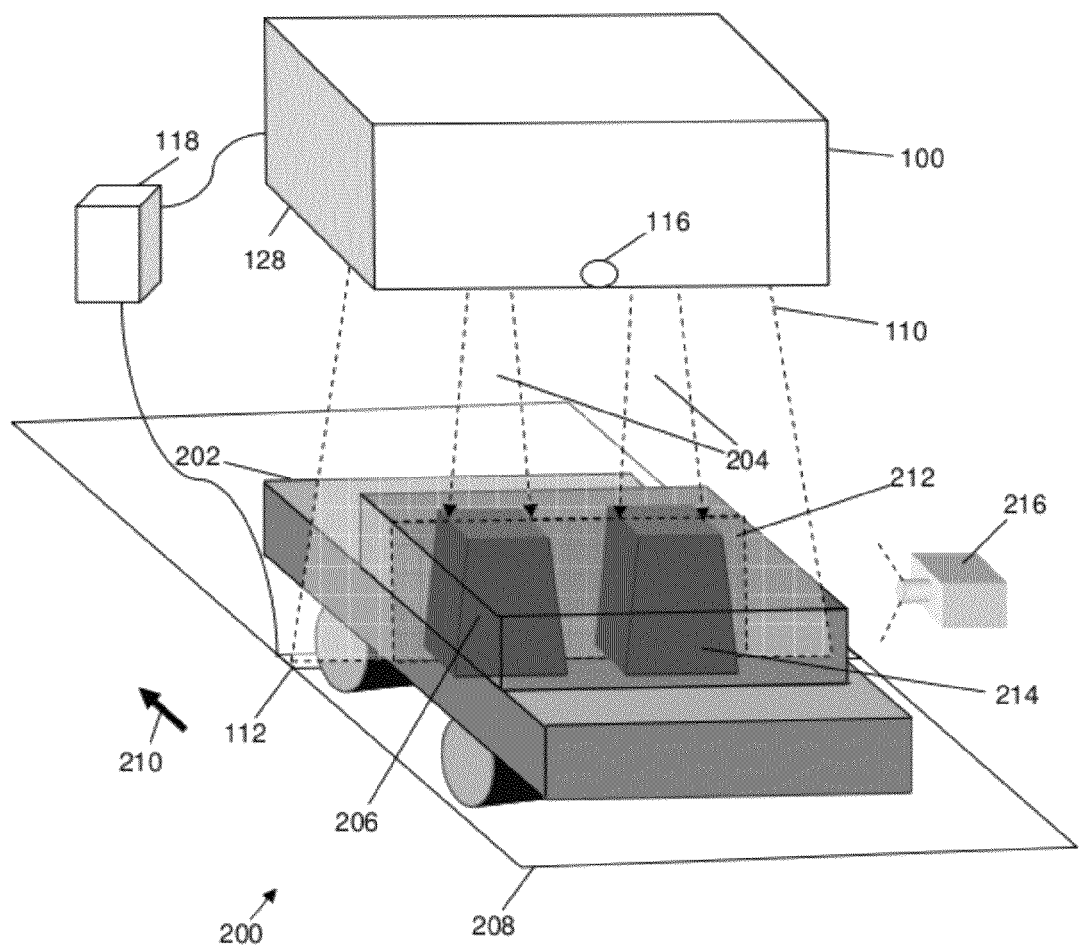
FIG. 2 shows a perspective view of an apparatus for attenuating high energy radiation.

FIG. 2 shows the use of the apparatus 100 in FIG. 1 as a drive-through vehicle screening device 200. Only the partition 128 of the apparatus, the control unit 118, the detector 116, the x-ray beam 110 and the image receptor 112 of the apparatus 100 are shown. A vehicle 202 driving through the x-ray beam 110 is scanned. Planar surface of the x-ray beam 110 intersects with a cross-sectional area 212 of the vehicle 202. The objective is to generate a composite x-ray image of the top down view of the vehicle 202 with the driver location and passenger location(s) of the vehicle 202 blocked (at least partly) from exposure to high energy radiation. The composite x-ray image is generated by combining slices of x-ray images of the top view of the vehicle 202 as it passes through the x-ray beam. The composite x-ray image of the vehicle 202 could be converted to image data for displaying on a monitor (not shown in FIG. 2). Other than to generate a complete top down view of an x-ray image of the vehicle 202, the time and date of the screening of the vehicle 202 could be logged and tagged to the x-ray image of the vehicle 202 for record tracing purposes. Furthermore, a separate camera with number plate recognition software can also be used for tagging vehicle plate number of the vehicle 202 to the images taken of the vehicle 202 again for record tracing purposes.

In FIG. 2, a driver location 214 and a passenger location 206 of the vehicle 202 are located under two respective regions 204 of the x-ray beam 110 where high energy radiation has been attenuated by the attenuation members (104 in FIG. 1). The driver location 214 and the passenger location 206 are deliberately blocked (at least partly) using the attenuation members (104 in FIG. 1) to prevent high energy radiation transmitted through the aperture (106 in FIG. 1) from reaching the driver and the passenger at the respective driver and passenger locations 214, 206 during the x-ray screening of the vehicle 202.

Before the vehicle 202 crosses the x-ray beam 110, the attenuation members (104 in FIG. 1) of the attenuation mechanism (108 in FIG. 1) are retracted into the attenuation mechanism (108 in FIG. 1) to allow transmission of the x-ray beam 110 through the aperture (106 in FIG. 1) to be received by the image receptor 112. The front section of the vehicle 202 crossing the x-ray beam 110 first is fully exposed to the x-ray beam 110. However, when the driver location 214 and the passenger location 206 of the vehicle 202 approaches the x-ray beam 110, the attenuation mechanism 108 receives a command from the control unit 118 to extend one or more attenuation members (104 in FIG. 1) into the path of the x-ray beam 110, resulting in blocking (at least partly) of the x-ray beam 110. That is, the attenuation members (104 in FIG. 1) only block (at least partly) the parts of the x-ray beam 110 directed towards the driver location 214 and the passenger location 206. Once the driver location 214 and the passenger location 206 have crossed the x-ray beam 110, the attenuation members (104 in FIG. 1) will retract to its original position, which resides within the attenuation mechanism (108 in FIG. 1), upon receiving another command from the control unit 118.

The dimensions of the driver location 214 and the passenger location 206 could be taken to have the typical median size of driver and passenger seats calculated based on a sample size of vehicles.

It is appreciated that the vehicle 202 may be a motorcar, motorcycle (in which case the vehicle user will be the motorcyclist and/or his/her passenger), truck (where the vehicle user may include person(s) in the rear of the truck) and the like.

Figure 10:
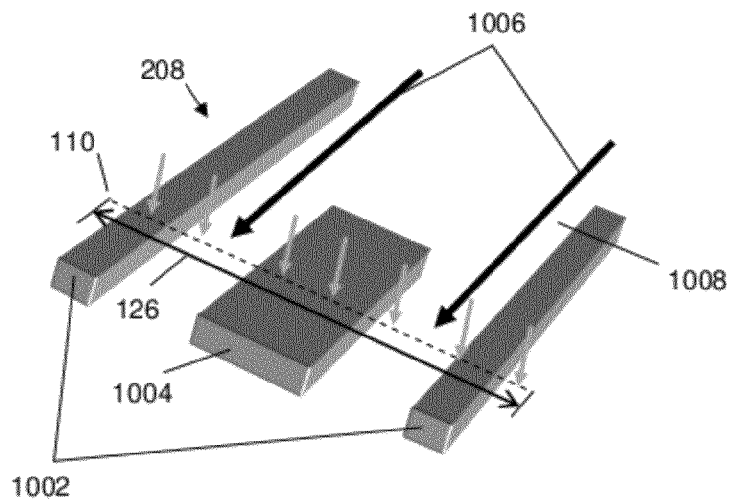
FIG. 10 shows a perspective view of a guideway for use in conjunction with an apparatus for attenuating high energy radiation.

The vehicle 202 is driven over a guideway 208 for directing the subject into the high energy radiation field in a preferred orientation. That is, a preferred orientation may be such that the vehicle is to approach the high energy radiation field at an angle perpendicular thereto. The guideway 208 will not necessarily restrict the vehicle approach only to approaches in such a perpendicular orientation, but will at least direct the vehicle towards an approximation thereof. With reference to FIGS. 2 and 10, the guideway 208 has a passageway with two curbs 1002 defining a lane 1008 for the vehicle 202 to drive through. The lane 1008 is parallel to the direction of travel of the vehicle 210. The guideway 208 is designed to guide the vehicle 202 to cross the x-ray beam 110 in a manner such that the direction of travel of the vehicle 210 is substantially perpendicular to the length 126 of the x-ray beam 110.

There is a raised platform 1004 located between the two curbs 1002. The raised platform 1004 should have a height that prevents vehicles from knocking into the raised platform 1004. The height should not be higher than the distance from the undercarriage of a four wheel vehicle to ground. The raised platform 1004 alerts drivers of vehicles driven through the x-ray beam 110 to adjust their vehicles so that the vehicles is straightened i.e. substantially perpendicular to the length 126 of the x-ray beam 110, as the vehicles pass through the x-ray beam 110. Wheels of four wheel vehicles move between the curbs 1002 and the raised platform 1004 in the manner indicated by arrows 1006 in FIG. 10. For bigger vehicles such as container trucks, the curbs 1002, instead of the raised platform 1004, are responsible for straightening the trucks as they cross the x-ray beam 110. When the vehicles are straightened, the attenuation members (104 in FIG. 1) could be more accurately deployed. That is, there is lesser chance of misalignment of the deployed attenuation members (104 in FIG. 1) with the parts of the vehicles to be, at least partially, blocked from high energy radiation exposure.

The detector 116 in FIG. 2 may comprise one or more sensors. A sensor could be a video camera. There is an overhead camera located at the position indicated as 116 in FIG. 2 for capturing top view of vehicles. There could also be an optional side camera 216 for capturing images of vehicles from a side view. Images of the vehicle 202 approaching that are captured by the cameras 116, 216 are sent to the control unit 118 for processing. Furthermore, infrared sensors could be distributed on the guideway 208 at various locations. Vehicle 202's approach could be detected by an infrared sensor located at a specific distance away from the x-ray beam 110. The x-ray source (102 in FIG. 1) could be energized only when the approaching vehicle 202 is detected or it could be energized continuously with the high energy radiation transmitted through the aperture (106 in FIG. 1) being, at least partly, blocked until vehicle 202's approach is detected. The positioning of the vehicle 202 with respect to the x-ray beam 110 could be detected depending on which infrared sensor(s) distributed on the guideway 208 detect the vehicle 202.

During operation, the detector 116 (or also known as camera 116 herein) is configured to capture in a first instance a reference image of the guideway 208 without any vehicle.

The reference image is used for comparing with real-time images of vehicles driven through the x-ray beam 110 during the screening process. On comparing pixel differences between the reference image and other snapshots of real-time images of vehicles approaching the x-ray beam 110, the changes in the pixel locations of the vehicle approaching the x-ray beam 110 relative to time could indicate the size, positioning with respect to the x-ray beam 110 and speed of the vehicle.

The control unit 118 is configured for computing the vehicle size and vehicle speed, and for determining the position of the driver and passenger locations 214, 206. The control unit 118 is also configured to activate the attenuation members (104 in FIG. 1) in dependence of information derived from the reference image, such as the positioning with respect to the x-ray beam 110.

Standard vehicle fixtures such as the side mirrors or wheels of the vehicle 202 can be identified via known imaging techniques to be used as reference points. If vehicle 202 is a normal motorcar/truck, the positions of the driver and passenger locations 214, 206, which are vehicle zones to be identified, are understood to fall between the side mirrors of the vehicle 202 and between the front wheels of the vehicle 202. Vehicle zones such as rear passenger seat locations of the vehicle 202 can be derived from the zonal positions of the driver and passenger locations 214, 206 by making assumptions that they are located a fixed distance away from the driver and passenger locations 214, 206. Such assumptions could be made based on the average distance between rear passenger seat locations and the driver and passenger locations 214, 206 for vehicles such as motorcars/trucks. The average distance could be derived by performing statistical analysis on a sample size of motorcars/trucks. Alternatively, object recognition imaging techniques may be employed to identify actual car/truck models or generalized car/truck shapes and retrieve dimensions relating to the car/truck models or shapes, which could be used to identify driver and passenger locations of the car/truck.

In one implementation, the lenses of the camera 116 may be wide angled lenses made with angles of view in the range of 120 to 180 degrees. The wide angle images, which are distorted, can be converted into undistorted top views of the vehicle 202 via known imaging techniques. With the undistorted top views of the vehicle 202, identifying vehicle zones such as the front driver and front passenger seats 214, 206 become an easier task since identification work via imaging techniques on undistorted views is easier than on distorted views.

The side camera 216 can help to improve accuracy of the identification of the driver and passenger locations 214, 206. While the overhead camera 116 captures top down angled images of the vehicle, the side camera 216 captures the side view of the vehicle 202. The windscreen or again side mirrors of the vehicle 202 could be used as reference points to identify the vehicle zones i.e. locations 214, 206.

Based on the information gathered on the vehicle size, vehicle speed and the positions of the driver and passenger locations, the respective attenuation members (104 in FIG. 1) of the attenuation mechanism (108 in FIG. 1) is activated (i.e. extended to the aperture 106) through commands from the control unit 118 just before the driver and passenger locations 214, 206 of the vehicle 202 cross the x-ray beam 110. Pixels of the driver and passenger locations 214, 206 of the vehicle 202 in the images could be marked out once the locations 214, 206 are pinpointed. The marked out locations 214, 206 are tracked until they cross the x-ray beam 110. The attenuation member (104 in FIG. 1) to at least partly block either the marked out location 214 or 206 is activated when either of the marked out locations 214 or 206 crosses a predetermined point in the x-ray beam 110. The x-ray beam 110 could be represented by a fixed virtual line marked out in the images. The line is split up into a number of parts that is the same as the number of attenuation members (104 in FIG. 1). Each part of the line corresponds with a respective attenuation member (104 in FIG. 1). The control unit is configured to command the extension of the respective attenuation members (104 in FIG. 1) once the locations 214, 206 in the image crosses the corresponding parts of the line in the image. Crossing the corresponding parts of the line is in reality crossing predetermined points in the x-ray beam 110. The pixels of the images of the marked out locations 214, 206 are said to have crossed the corresponding parts of the line when one or more of their image pixels comes into contact with the corresponding parts of the line. It is appreciated that imaging techniques for tracking a marked out moving subject (in this case, the locations 214, 206) on moving images is known to a person skilled in the relevant art.

The respective attenuation members (104 in FIG. 1) are deactivated (i.e. retracted) through commands from the control unit 118 after the pixels of the marked out driver and passenger locations 214, 206 of the vehicle 202 in the images captured by the camera 116 have completely crossed the line representing the x-ray beam 110.

In another implementation, the centre of the approaching vehicle 202 is taken as reference point in the images captured by camera 116 instead of the side minors. When the centre of the vehicle 202 crosses the line representing the x-ray beam 110, the attenuation member 104 corresponding with the part of the line where the centre of the vehicle 202 has crossed (hereinafter known as attenuation member A) is not extended. However, the two attenuation members 104 adjacent to the attenuation member A would be extended. This ensures that the gap between the driver seat and the front passenger seat, which sits no people, would be subjected to x-ray scanning. To ensure that the implementation works, the widths of the attenuation members 104 need to be adjusted appropriately. With regard to rear passenger seats to be blocked (at least partly) from high energy radiation, their estimated locations can be derived from the location of the centre of the approaching vehicle 202.

Not all the driver and passenger locations of the vehicle 202 need to be blocked from high energy radiation exposure. Passenger seats with no passengers need not be blocked from radiation exposure. The control unit 118 of the apparatus 100 may allow an operator to input the number and positioning of the passengers in the vehicle 202 before the vehicle 202 crosses the x-ray beam 110. With information on selected positioning of the passengers in the vehicle 202, software of the control unit 118 will instruct the attenuation mechanism (108 in FIG. 1) to only extend the attenuation members (104 in FIG. 1) that attenuate high energy radiation directed towards the selected passenger seat position(s) and the driver position during the vehicle screening process.

For example, if there is no passenger in the vehicle 202, the control unit 118 will instruct the attenuation mechanism (108 in FIG. 1) to only block (at least partly) the driver's location 214. In another situation when a front passenger location 206 beside the driver's location 214 is selected by the operator, the control unit 118 will instruct the attenuation mechanism (108 in FIG. 1) to block (at least partly) only the driver location 214 and the front passenger location 206, leaving rear passenger seat locations of the vehicle 202 exposed to high energy radiation and subjected to screening by the apparatus 100.

It is appreciated that the positioning of passengers in the vehicle 202 could be detected automatically by using the side camera 216 to capture images of people on board the vehicle 202. A human face recognition software may be used to detect the number of people on board the vehicle 202. The driver of the vehicle 202 should be asked to wind down the windscreens of the vehicle 202 to reveal the faces of the persons sitting in the vehicle 202 for the face recognition software to work.

The attenuation mechanism 108 could receive commands from the control unit 118 to extend or retract the attenuation members 104 in dependence of the calculated speed of approach of the vehicle 202. The time to keep the attenuation members 104 extended or retracted is made proportional to the speed of approach of the vehicle 202 as calculated by the control unit 118. If the vehicle 202 stops with the driver and passenger locations 214, 206 passing halfway through the x-ray beam 110, the calculated speed of the vehicle 202 is zero. In this case, the attenuation members 104 remains in extended position until the driver and passenger locations 214, 206 cross the x-ray beam 110. If the vehicle 202 is travelling at a fast speed, a shorter time is required for the attenuation members 104 to remain in extended position. The retract command will only be issued when the control unit 118 has detected by pixel comparison of the captured images of the vehicle 202 that the driver and the passenger locations 214, 206 of the vehicle 202 have completely crossed the x-ray beam 110.

Advantageously, the apparatus 100 in FIG. 2 eliminates x-ray high energy radiation exposure on the driver and passengers of the vehicle 202. This alleviates health threats to driver and passengers during the vehicle screening process. Furthermore, a higher dosage of the x-ray may be applied to provide better x-ray images on all other areas of the vehicle 202 other than the areas at least partly blocked. This is useful particularly if any materials used on the vehicle contains high energy radiation filtering properties. Moreover, no switching on or off of the x-ray source or use of multiple x-ray sources is required to eliminate high energy radiation exposure to the driver and passengers of the vehicle 202.

Figure 3A:
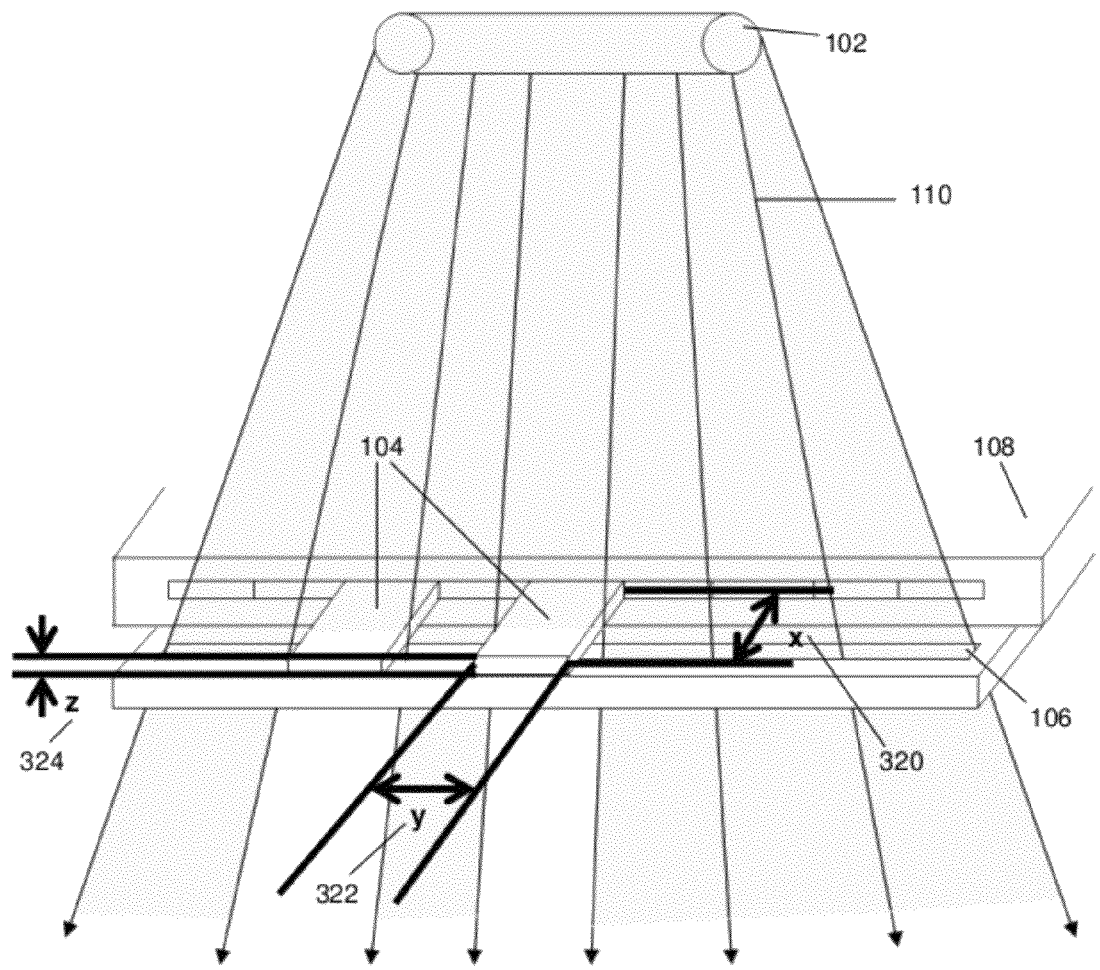
FIG. 3A shows a perspective view of an apparatus for attenuating high energy radiation.

With reference to FIG. 3A, each attenuation member 104 is substantially in the shape of a cuboid or rectangular cuboid. The dimensions of the portion of the attenuation members 104 that could be extended outside of the attenuation mechanism 108 are x 320 (length), y 322 (width), and z 324 (height or thickness) respectively. x 320 has to be long enough to, at least partly, block the width (124 in FIG. 1) of the aperture 106. y 322 is proportional in size to the width of the driver or passenger locations (e.g. 214 and 206 in FIG. 2). The attenuation member 104 with width y 322 standing in the way of high energy radiation transmitted through the aperture (106 in FIG. 1) casts a "shadow" [i.e. area of vehicle 202 blocked (at least partly) from high energy radiation] over the width of the driver or passenger locations (214 and 206 in FIG. 2). The "shadow" increases or decreases its width when the width of the attenuation member 104 increases or decreases respectively as well. The distance between the high energy radiation source 102 and the attenuation member 104 is also proportional to the distance between the x-ray source 102 and vehicle seats at the driver or passenger locations (e.g. 214 and 206 in FIG. 2). The "shadow" also increases or decreases its width based on adjustment of the two distances. For instance, the distance between the x-ray source 102 and vehicle seats at the driver or passenger locations (e.g. 214 and 206 in FIG. 2) need to be longer to maintain a "shadow" of a specific width if the distance between the high energy radiation source 102 and the attenuation member 104 is made longer. z 324 is made proportional to the energy of high energy radiation produced at the high energy radiation source 102. A typical x-ray beam 110 at 160 kVp will be able to penetrate through 10-20 mm of steel. The x-ray penetration power for lead is about 0.4 times of steel, thus, the height, z 324, to effectively block (at least partly) the x-ray source should be at least 4 mm or more.

Figure 3B:
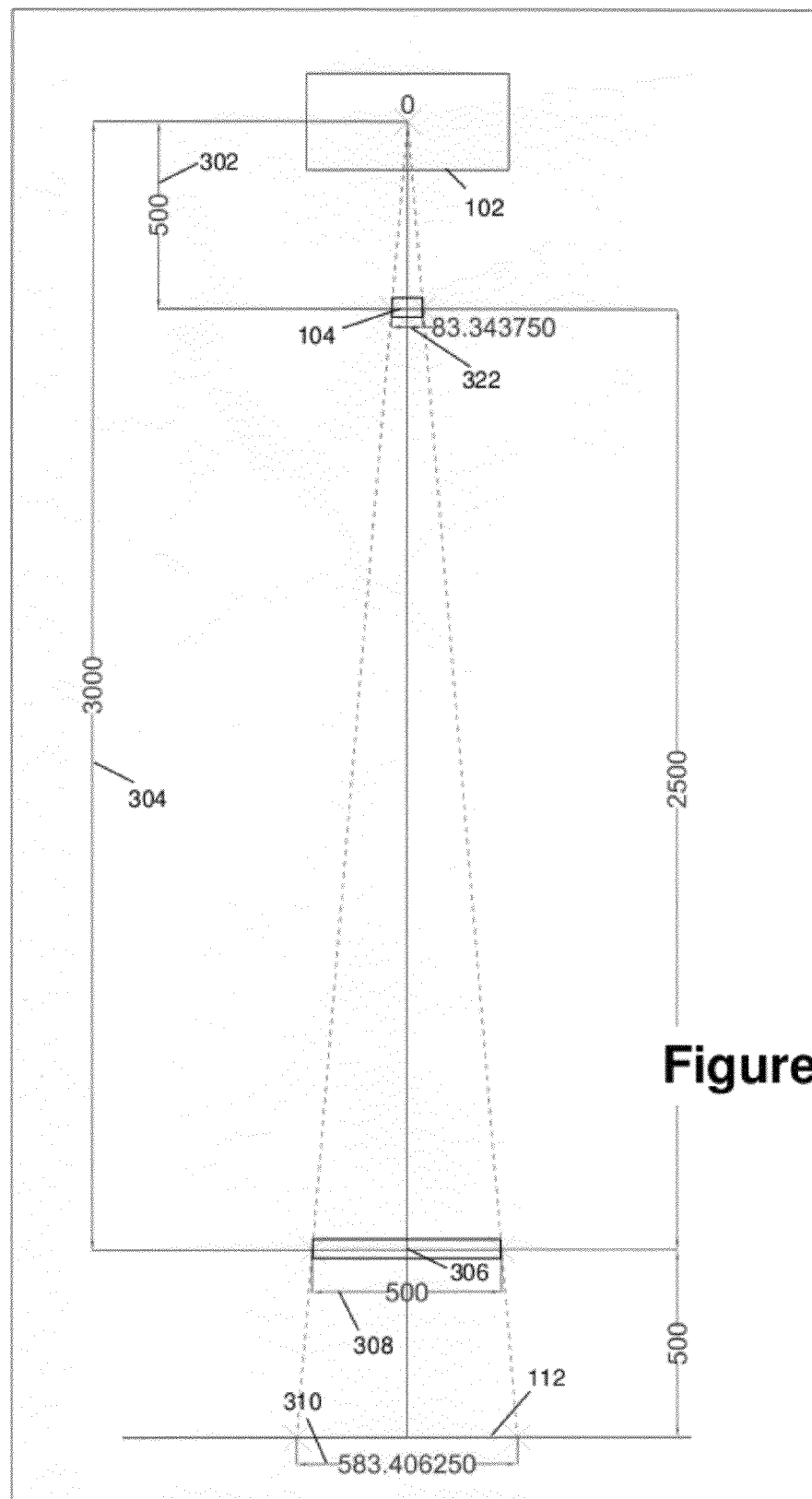
FIG. 3B shows a cross-sectional view of an apparatus for attenuating high energy radiation.

FIG. 3B shows an example of the dimensions for the apparatus 100 described with reference to FIGS. 1 and 2. A driver's location 306 of a vehicle (202 in FIG. 2) is blocked (at least partly) from exposure to high energy radiation from the high energy radiation source 102. The high energy radiation source 102 is placed 3000 millimeters (mm) above the driver's location 306 and 500 mm from the attenuation member (104 in FIG. 1). To effectively block (at least partly) the driver's location 306 with width 308 of about 500 mm, the width, y 322 of the attenuation member (104 in FIG. 1), has to be about 83.34 mm. It is appreciated that the width, y 322, could actually be less than 83.34 mm. However, this requires use of more than one adjacently disposed attenuation members 104 with a combined width adding up to about 83.34 mm. For attenuation members 104 with lesser width, although more attenuation members 104 need to be used, higher precision and flexibility could be achieved when it comes to attenuating the high energy radiation transmitted through the aperture 106. Assuming the distance between the driver's location 306 and the location of the image receptor 112 is 500 mm, the width 310 of the locations that is partially or completely blocked from high energy radiation exposure is about 583.41 mm.

Length 126 i.e. the length of the aperture 106 in FIG. 1 for a drive-through vehicle screening device 200 could range from about 168 mm to 504 mm when the high energy radiation source 102 is located at the distance of about 3000 mm away from a driver's location 306 of a vehicle.

Figure 4:
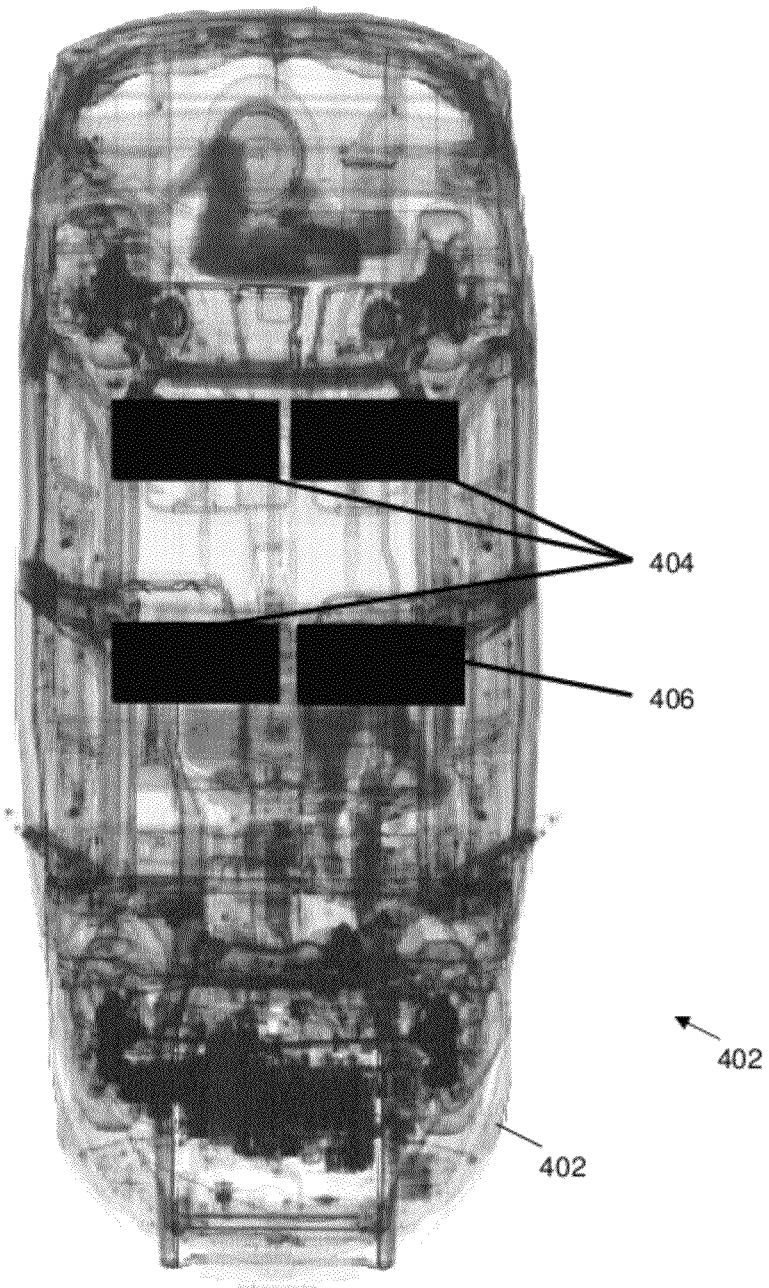
FIG. 4 shows a top down view of an x-ray image of a vehicle containing portions, at least partly, blocked from high energy radiation exposure.

FIG. 4 shows an x-ray image of a vehicle 402 with a driver location 404 and three passenger locations 406, at least partly, blocked from high energy radiation exposure using the apparatus 100 described with reference to FIGS. 1 to 3.

Other applications of the apparatus 100 in FIG. 1 may be in the field of human body scanning.

During a normal body scan of a human, a near naked image of the human body is captured. To protect the privacy of the person, the near naked image could be processed by software to mask off the sensitive/private parts of the person subjected to the body scan. It is appreciated that the use of the apparatus 100 could do away with the software processing step.

Figure 5:
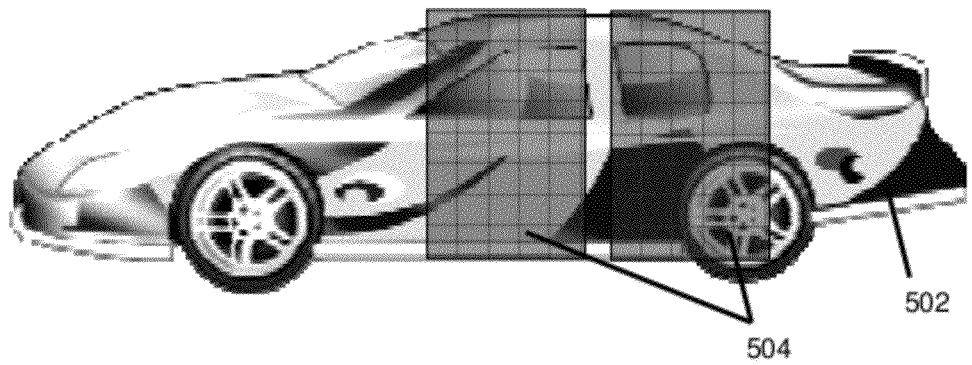
FIG. 5 shows a side view of a vehicle containing portions, at least partly, blocked from high energy radiation exposure.
Figure 6:
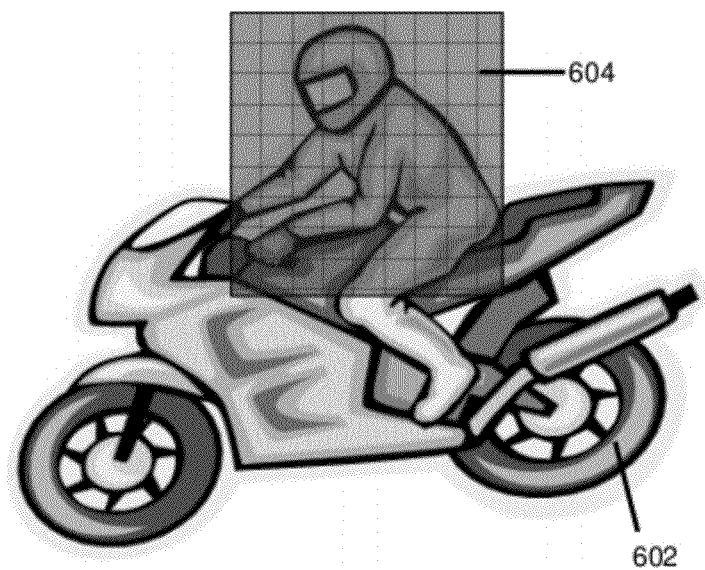
FIG. 6 shows a side view of a motorcycle containing portions, at least partly, blocked from high energy radiation exposure.

It is appreciated that the apparatus 100 described with reference to FIG. 2 could be arranged to capture x-ray images of side views of drive-through vehicles instead of top down views. That is, instead of disposing the partition 128 of the apparatus 100 above drive-through vehicles and the image receptor 112 on the floor below the drive-through vehicles, the partition 128 could be located on the left or right side of drive-through vehicles and the image receptor 112 is located on the respective right or left side of the drive-through vehicles. FIG. 5 illustrates a side view of a motorcar 502 where front and rear driver and passenger locations 504 are, at least partly, blocked from high energy radiation exposure. FIG. 6 illustrates a side view of a motorcycle 602 where its pillion location 604 is, at least partly, blocked from high energy radiation exposure.

An implementation of an apparatus for the example described in FIG. 5 includes use of camera(s) to capture side views of the motorcar 502. The apparatus has similar design as the apparatus 100 in FIG. 1. However, the high energy radiation source and image receptor are located on left and right sides of the motorcar 502 respectively and not on respective top and bottom sides (which is the case for the example of FIG. 2). The front and rear wheels of the motorcar 502 could be selected as reference points to identify and mark out in the captured images the driver and passenger locations 504 (i.e. specific vehicle zones) of the motorcar 502 to be, at least partly, blocked from high energy radiation. The driver and passenger locations 504 are understood to be located behind the front wheels and in front of the rear wheels. All the attenuating member(s) of the attenuation mechanism for the apparatus in the present implementation is/are instructed to extend when the marked out driver and passenger locations 504 of the motorcar 502 crosses an indication of the location of the x-ray beam in the images captured by the camera(s). The attenuating member(s) is/are instructed to retract when the marked out driver and passenger locations 504 of the motorcar 502 have fully crossed the indication of the location of the x-ray beam in the images captured by the camera(s).

An implementation of an apparatus for the example described in FIG. 6 may similarly include use of camera(s) to capture side views of the motorcycle 602. The apparatus has similar design as the apparatus 100 in FIG. 1. The high energy radiation source and image receptor are located on left and right sides of the motorcycle 602 respectively and not on respective top and bottom sides. For motorcycles, it is inevitable to expose the legs of the motorcyclist to high energy radiation unless powerful object recognition software is employed to locate the position of the legs of the motorcyclist. Practically, as illustrated in the present implementation, only the upper body of the motorcyclist is, at least partly, blocked from high energy radiation exposure. The front and rear wheels of the motorcycle 602 could be selected as reference points to identify and mark out in the captured images the upper body of the motorcyclist 604 (which can be considered a specific zone of the motorcycle) to be, at least partly, blocked from high energy radiation exposure. The attenuating member(s) of the attenuation mechanism for the apparatus in the present implementation is arranged to, at least partly, block only the upper body of the motorcyclist 604. The attenuating member(s) is/are instructed to extend when the marked out upper body of the motorcyclist 604 crosses an indication of the location of the x-ray beam in the images captured by the camera(s). The attenuating member(s) is/are instructed to retract when the marked out upper body of the motorcyclist 604 have fully crossed the indication of the location of the x-ray beam in the images captured by the camera(s).

It is further appreciated that the partition 128 of the apparatus 100 and the image receptor 112 could be built on a moveable gantry. A vehicle is scanned by moving the gantry across the length of the vehicle when the vehicle is stationary instead of driving the vehicle across a stationary gantry, which is as described with reference to FIGS. 1 and 2. The driver location and passenger location(s) could be determined by locating from captured images of the stationary vehicle predicted positions of where the driver location and passenger location(s) should be located.

Figure 8:
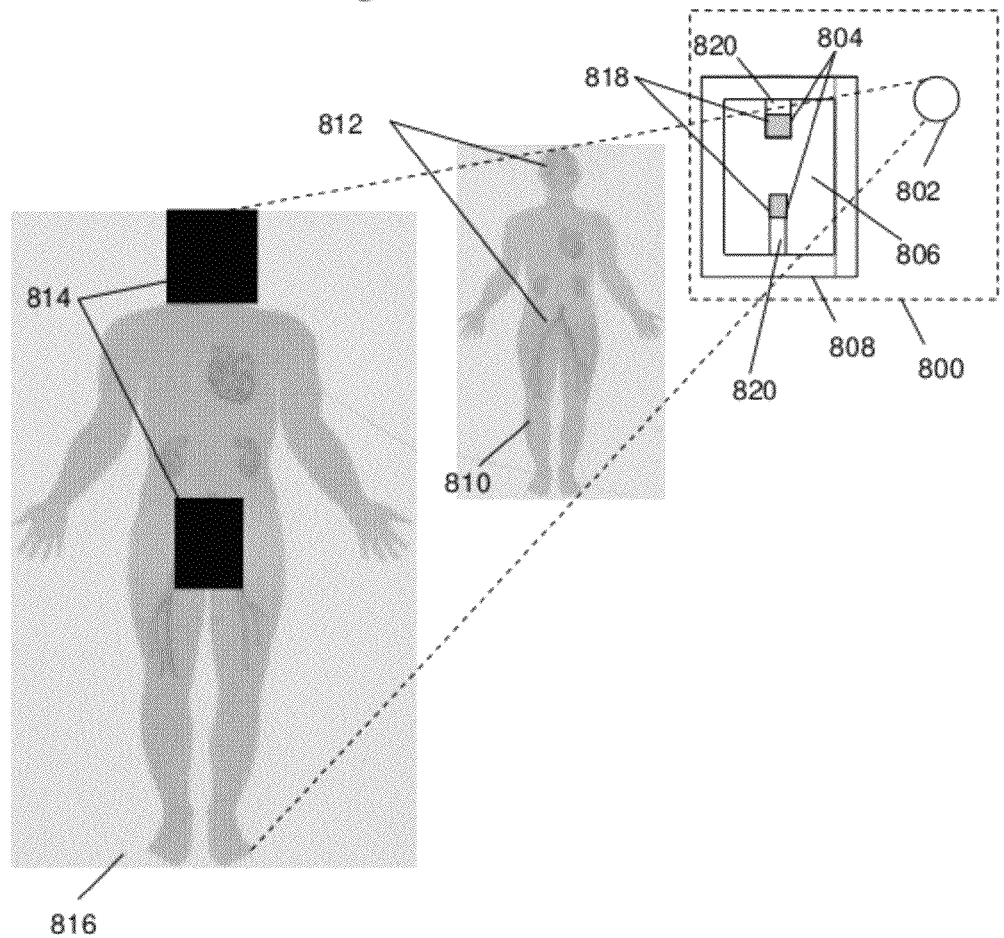
FIG. 8 illustrates an apparatus for attenuating high energy radiation.

FIG. 8 shows an apparatus 800 that operates according to similar principles as the apparatus 100 described with reference to FIG. 1. Apparatus 800 identifies a zone of a live subject, and selectively positions the attenuation member to attenuate high energy radiation in the high energy radiation field directed towards the zone of the live subject. The apparatus 800 is used to, at least partly, block sensitive/private parts 812 of a person 810 (or in other words, a live subject) in a body scan from high energy radiation exposure. The apparatus 800 comprises a high energy radiation source 802, for instance, an x-ray source, a detector 818 and an attenuation mechanism 808. The body of the apparatus 800 has a rectangular shaped aperture 806 allowing high energy radiation directed towards the person 810 to go through. Attenuation members 804 extendable from the attenuation mechanism 808 into the area of the aperture 806 are used to, at least partly, block high energy radiation exposure to the sensitive/private parts 812 of the person 810. The attenuation members 804 are positioned selectively in dependence of information derived from at least one image of the person 810. The attenuation members 804 extend from the attenuation mechanism 808 upon the detector 818 detecting from an image of the person captured by the detector 818, the sensitive/private parts 812 of the person to block off (at least partly) from high energy radiation exposure. In the present example, the attenuation members 804 extend from the top side and bottom side of the aperture 806. It is appreciated that the length of the attenuation members 804 could be made adjustable for blocking (at least partly) high energy radiation directed towards the sensitive/private parts of people of different body heights. Each attenuation member 804 has a non-radiation penetrable part 818 and a high energy radiation penetrable part 820. The non-radiation penetrable part 818 is responsible for blocking (at least partly) the sensitive/private parts 812 of the person 810 in the taken x-ray image 816 produced. The at least partly blocked parts show up as dark patches 814 in the taken x-ray image 816. Advantageously, invasion of privacy of the person is eliminated prior to presentation of the taken x-ray image 816 on a computer monitor for diagnosis. There will be no requirement for software processing to mask off the sensitive/private parts 812 of the person.

It is noted that the x-ray image taken through the rectangular shaped aperture 806 is not a composite of many "slices" of any one view of the person like in the examples described with reference to FIGS. 1 and 2 for certain subjects and vehicles. The x-ray image of the whole person is taken here. Having mentioned that, it is appreciated that taking "slices" of one view of the whole person and using an attenuation mechanism with the same design as the attenuation mechanism 108 in FIG. 1 is also feasible for the current application.

Figure 9:
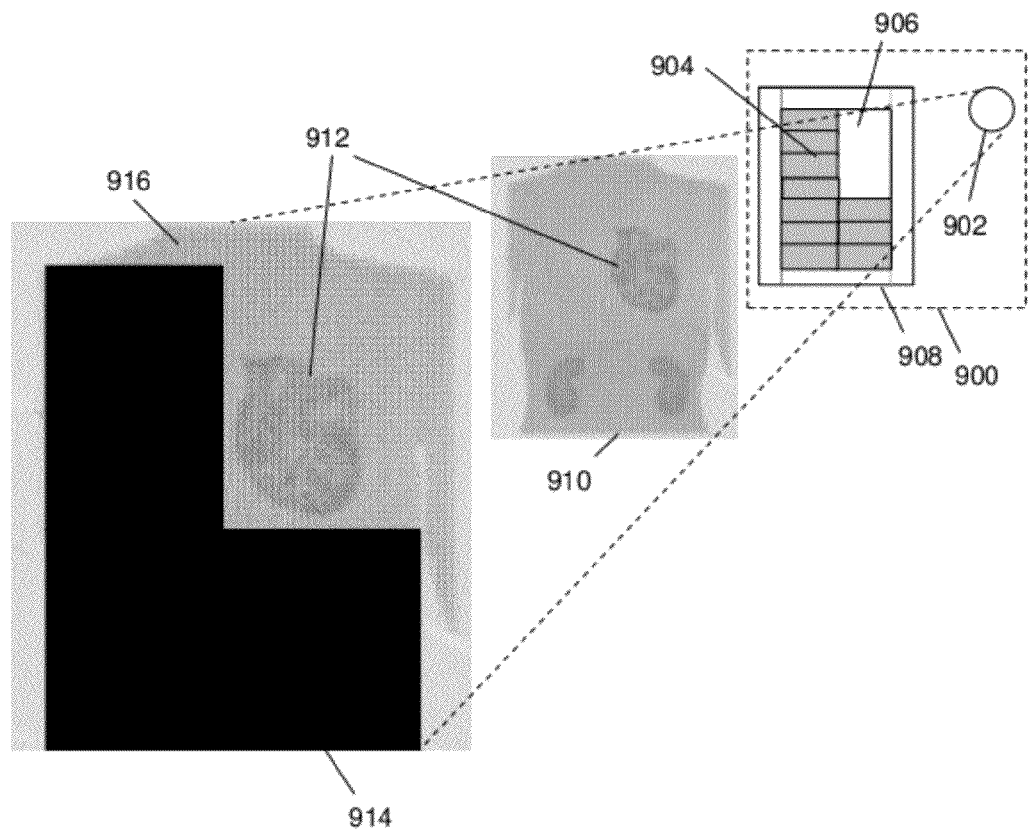
FIG. 9 illustrates an apparatus for attenuating high energy radiation.

FIG. 9 shows an apparatus 900 for x-ray scanning in the medical field that is similar to the apparatus 800 described with reference to FIG. 8. More specifically, the apparatus 900 is used to capture an x-ray image of an upper body 910 of a person (or in other words, a live subject). X-ray images taken using conventional x-ray machines usually contain redundant parts not required for medical diagnosis. For example, if a person only has heart related issues, the heart specialist performing the diagnosis is only interested in the x-ray images of the person's heart 912. The rest of the x-ray image taken of the upper body 910 of the person other than the heart 912 is deemed redundant and unnecessary high energy radiation exposure to the person. Use of the apparatus 900 helps to prevent exposing the person to high energy radiation unnecessarily.

The apparatus 900 comprises an x-ray source 902, a detector 918, and an attenuation mechanism 908. The body of the apparatus 900 has a rectangular shaped aperture 906 allowing high energy radiation directed towards the upper body 910 of the person to go through. The attenuation mechanism 908 comprises a plurality of attenuation members 904. The attenuation members 904 are extendable from the attenuation mechanism 908 into the area of the aperture 908 to, at least partly, block high energy radiation exposure to the redundant parts of the upper body 910 of the person. The attenuation members 904 are positioned selectively in dependence of information derived from at least one image of the upper body 910 of the person. The attenuation members 904 extend from the attenuation mechanism 908 upon the detector 918 detecting from an image of the person captured by the detector 918, the redundant parts of the upper body 910 to block (at least partly) from high energy radiation exposure. In the present example, the plurality of attenuation members 904 extends from the left side and right side of the area of the aperture 906. Each of the plurality of attenuation members 904 is made of high energy radiation penetrable material. The at least partly blocked parts show up as dark patches 914 in the taken x-ray image 916. Advantageously, in the taken x-ray image 916, the image of the heart 912 necessary for medical diagnosis is isolated from the redundant parts unnecessary for medical diagnosis and the person is not subjected to unnecessary high energy radiation directed towards the redundant parts.

It is noted that the x-ray image taken through the rectangular shaped aperture 906 is not a composite of many "slices" of any one view of the upper body of the person like in the examples described with reference to FIGS. 1 and 2 for certain subjects and vehicles. The x-ray image of the whole upper body of the person is taken here. Having mentioned that, it is appreciated that taking "slices" of one view of the upper body of the person and using an attenuation mechanism with the same design as the attenuation mechanism 108 in FIG. 1 is also feasible for the current application.

It is appreciated that the detector 818 or 918 described with reference to FIGS. 8 and 9 respectively could, for instance, be a camera that is working cooperatively with a control unit (not shown in the figures). By attaching indicative stickers on the body of the person, the camera and control unit setup can identify from the images of the person the location of the body of the person that is not to be exposed to high energy radiation. Alternatively, standard features of the body of a person such as the head, nipples, belly button, body structure, etc. captured on the camera could also be used as indicators for determining from the captured image the body parts that are not to be exposed to high energy radiation. The control unit is responsible for analyzing the images captured on the camera to identify the parts to be exposed or not to be exposed to high energy radiation. In another example, the detector 818 or 918 may comprise a camera for capturing the body of the person and a monitor for displaying the image of the captured body. Through use of appropriate software, an operator can mark out on the image displayed on the monitor the areas of interest or identify parts of body, which are not required to be exposed to high energy radiation. The attenuation member(s) (804 in FIG. 8 or 904 in FIG. 9) of the attenuation mechanism (808 in FIG. 8 or 908 in FIG. 9) are then activated according to the marked out areas.

Figure 11:
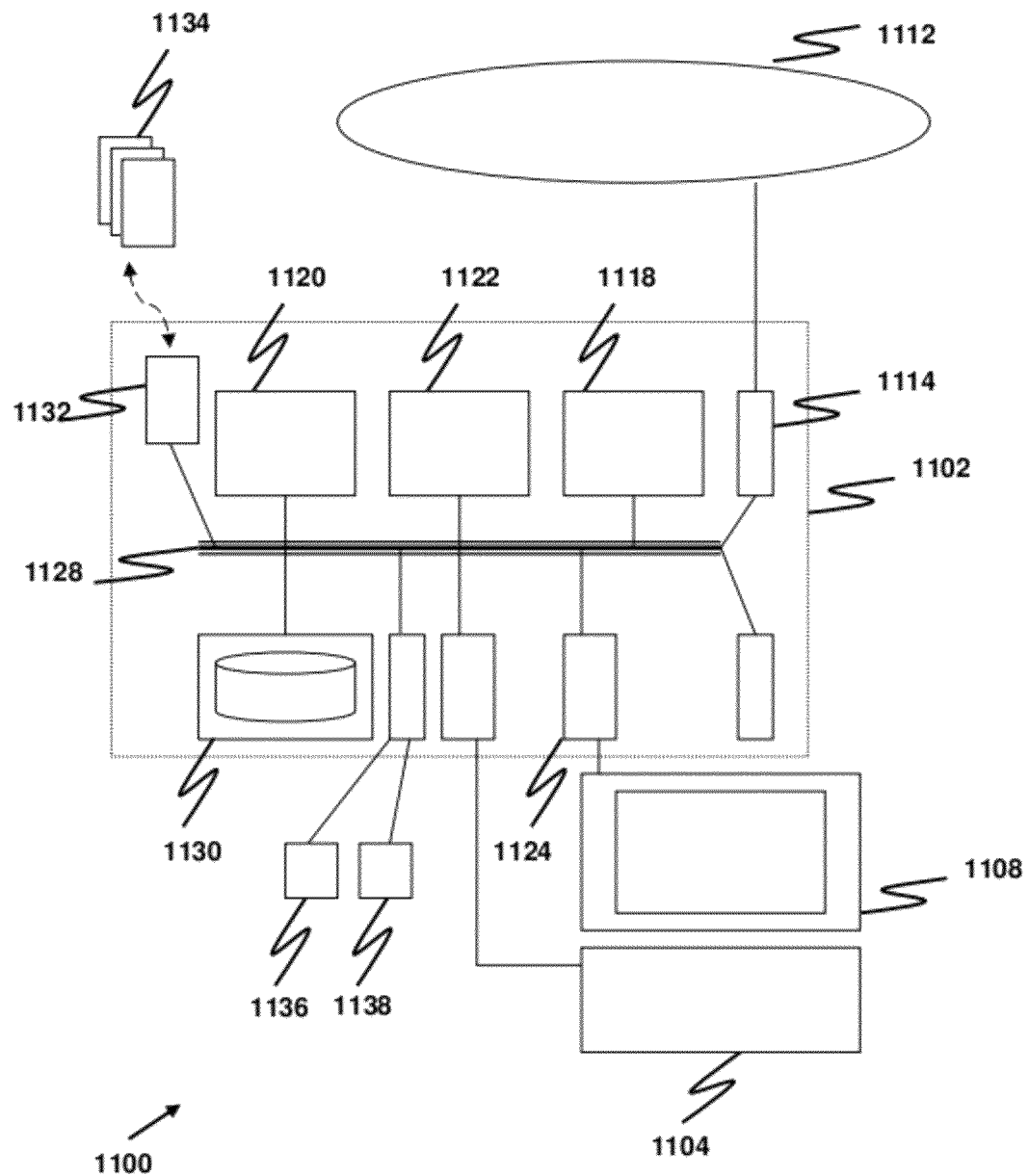
FIG. 11 is a schematic drawing of a control unit of an apparatus for attenuating high energy radiation.

The control unit 118 in FIG. 1 and the control unit mentioned above with examples described with reference to FIGS. 8 and 9 may be a computer 1100, schematically shown in FIG. 11. There may be provided software, such as one or more computer programs being executed within the computer 1100, and instructing the computer 1100 to conduct imaging techniques [e.g. tracking moving subjects/marked out items in images, marking out reference items in images, converting distorted wide angle images to straightened images, etc.] and control functions [e.g. triggering the attenuation member(s) 104 to extend or retract, operating the high energy radiation source 102, etc.] herein described, including for instance the code instructions for displaying see-through images (e.g. x-ray or gamma ray images) on monitors, for displaying images caught on cameras (e.g. 116, 216 in FIG. 2 or detector 818 or 918 in FIGS. 8 and 9), identifying locations to be, at least partly, blocked or locations not to be blocked (partly or completely) from high energy radiation, converting distorted wide angle images to undistorted images, etc.

The computer 1100 comprises a processing unit 1102 for processing the one or more computer programs, and includes input modules such as cameras 1136 and 1138 (e.g. cameras 116 and 216 in FIG. 2 or detector 818 or 918 in FIGS. 8 and 9), a keyboard/keypad 1104, and/or a plurality of output devices such as a display 1108 to facilitate interaction with the computer system 600.

The processing unit 1102 may be connected to a computer network 1112 via a suitable transceiver device 1114 (i.e. a network interface), to enable access to e.g. the Internet or other network systems such as a wired Local Area Network (LAN) or Wide Area Network (WAN). The processing unit 1102 may also be connected to one or more external wireless communication enabled devices 1134 via a suitable wireless transceiver device 1132 e.g. a WiFi transceiver, Bluetooth module, Mobile telecommunication transceiver suitable for Global System for Mobile Communication (GSM), 3G, 3.5G, 4G telecommunication systems, or the like.

The processing unit 1102 in the example includes a processor 1118, a Random Access Memory (RAM) 1120 and a Read Only Memory (ROM) 1122. The processing unit 1102 also includes a number of Input/Output (I/O) interfaces, for example I/O interface 1124 to the display 1108, and I/O interface 1126 to the cameras 1136, 1138 and the keyboard 1104.

The components of the processing unit 1102 typically communicate via an interconnected bus 1128 and in a manner known to the person skilled in the relevant art.

The computer programs may further include one or more software applications for e.g. instant messaging platform, audio/video playback, internet accessibility, operating the computer system 1100 (i.e. operating system), network security, file accessibility, database management, which are applications typically equipped on a desktop or portable computer. The computer programs may be supplied to the user of the computer system 1100 encoded on a data storage medium such as a CD-ROM, on a flash memory carrier or a Hard Disk Drive, and are to be read using a corresponding data storage medium drive of a data storage device 1130. Such application programs may also be downloaded from the computer network 1112. The application programs are read and controlled in its execution by the processor 1118. Intermediate storage of program data may be accomplished using RAM 1120.

Furthermore, one or more of the steps of the computer programs may be performed in parallel rather than sequentially. One or more of the computer programs may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the Wireless LAN (WLAN) system. The computer program when loaded and executed on such a general-purpose computer effectively results in an apparatus that implements the steps of the computing methods (i.e. for image processing, controlling the attenuation mechanism 108 in FIG. 1, for operating the high energy radiation source 102 in FIG. 1, etc.) in examples herein described.

Many modifications and other examples can be made to the apparatus and method for attenuating high energy radiation by those skilled in the art having the understanding of the above described disclosure together with the drawings. Therefore, it is to be understood that the apparatus and method for attenuating high energy radiation is not to be limited to the above description contained herein only, and that possible modifications are to be included in the claims of the disclosure.

The invention claimed is:

1. An apparatus for attenuating high energy radiation during vehicle inspection, the apparatus comprising:
a plurality of attenuation members for attenuating high energy radiation in a corresponding plurality of portions of a high energy radiation field emitted from a high energy radiation source towards a subject vehicle; and
a control unit for determining the corresponding plurality of portions of the high energy radiation field to be attenuated by the plurality of attenuation members
based on comparison between the type of the vehicle as identified from an image of the vehicle and predefined criteria for the type of the vehicle defined prior to activation of one or more of the plurality of attenuation members, and
for selectively activating the one or more of the plurality of attenuation members to attenuate the determined corresponding plurality of portion of the high energy radiation field;
wherein the predefined criteria corresponds to typical driver and passenger locations in the type of the vehicle and the attenuating of the high energy radiation in the determined corresponding plurality of portions shields each of the typical driver and passenger locations separately.

2. The apparatus of claim 1 configured to identify a zone of the vehicle to pass the high energy radiation field, the control unit being configured to activate the one or more of the plurality of the attenuation members thereby to attenuate high energy radiation in the high energy radiation field directed towards the zone of the vehicle.

3. The apparatus of claim 2 configured to identify the zone of the vehicle from an image of the vehicle, the image comprising data relating to a vehicle user and for the control unit to activate the one or more of the plurality of attenuation members in dependence of information derived from a series of images of the vehicle.

4. The apparatus of claim 3, wherein the control unit is configured to activate the one or more of the plurality of attenuation members in dependence of information derived from a reference image.

5. The apparatus of claim 2 configured to activate the one or more of the plurality of attenuation members when a point in the zone crosses a predetermined point in the high energy radiation field.

6. The apparatus of claim 1, wherein the one or more of the plurality of attenuation members is arranged to be deployed into and retracted from the high energy radiation field.

7. The apparatus of claim 1 further comprising a partition having an aperture for the high energy radiation field to pass therethrough, and the apparatus is arranged for the one or more of the plurality of the attenuation members to attenuate the determined corresponding plurality of portions of the high energy radiation field passing through the aperture.

8. The apparatus of claim 1 further comprising a housing for housing the plurality of attenuation members, the apparatus being arranged for the one or more of the plurality of attenuation members to be selectively activated by being deployed from within the housing and to be deactivated by being retracted into the housing.

9. The apparatus of claim 1 further comprising an image receptor for acquiring data for producing a radiographic image 5 of the vehicle.

10. The apparatus of claim 1 further comprising a guideway for directing the vehicle into the high energy radiation field in a preferred orientation.

11. A method for attenuating high energy radiation during vehicle inspection, the method comprising:
determining a plurality of portions of a high energy radiation field to be attenuated by a plurality of attenuation members based on comparison between type of a vehicle as identified from an image of the vehicle and predefined criteria for the type of the vehicle defined prior to activation of one or more of the plurality of attenuation members for attenuation, the high energy radiation field being emitted from a high energy radiation source towards the vehicle; and
selectively activating the one or more of the plurality of attenuation members under control of a control unit to attenuate the determined plurality of portions of high energy radiation in the high energy radiation field;
wherein the predefined criteria corresponds to typical driver and passenger locations in the type of the vehicle and the selectively activating the one or more of the plurality of attenuation members to attenuate the determined plurality of portions of high energy radiation shields each of the typical driver and passenger locations separately;
calculating a speed of approach of the subject from a first image of the subject at a first point approaching the high energy radiation field and a second image of the subject at a second point approaching the high energy radiation field; and
activating the attenuation member in dependence of the calculated speed of approach.

12. The method of claim 11 further comprising:
identifying a zone of the vehicle passing through the high energy radiation field; and
activating the one or more of the plurality of attenuation members to attenuate high energy radiation in the high energy radiation field directed towards the zone of the vehicle.

13. The method of claim 12 further comprising:
identifying the zone of the vehicle from an image of the vehicle, the image comprising data relating to a vehicle user; and
activating the one or more of the plurality of attenuation members in dependence of information derived from a series of images of the vehicle.

14. The method of claim 13 further comprising:
activating the one or more of the plurality of attenuation members in dependence of information derived from a reference image.

15. The method of claim 13 further comprising:
activating the one or more of the plurality of attenuation members when a point in the zone crosses a predetermined point in the high energy radiation field.

16. The method of claim 11 further comprising:
selectively activating the one or more of the plurality of attenuation members by deploying the one or more of the plurality of attenuation members into the high energy radiation field and retracting the one or more of the plurality of attenuation members from the high energy radiation field.

17. The method of claim 11 further comprising:
attenuating the determined plurality of portions of the high energy radiation field passing through an aperture of a partition.

18. The method of claim 11 further comprising:
selectively activating one or more of the plurality of attenuation members to be deployed from within a housing and to be deactivated by being retracted into the housing.

19. The method of claim 11 further comprising:
using an image receptor to acquire data for producing a radiographic image of the vehicle.

20. The method of claim 11 further comprising:
using a guideway to direct the vehicle into the high energy radiation field in a preferred orientation.

21. The apparatus of claim 3, wherein the series of images comprises a first image of the vehicle at a first point approaching the high energy radiation field and a second image of the vehicle at a second point approaching the high energy radiation field, and the control unit is configured to calculate a speed of approach of the vehicle from the first image and the second image and to activate the one or more of the plurality of attenuation members in dependence of the calculated speed of approach.

22. The method of claim 13 further comprising:
calculating a speed of approach of the vehicle from a first image of the vehicle at a first point approaching the high energy radiation field and a second image of the vehicle at a second point approaching the high energy radiation field; and
activating the one or more of the plurality of attenuation members in dependence of the calculated speed of approach.

* * * * *